Figures 1, 2, 3:
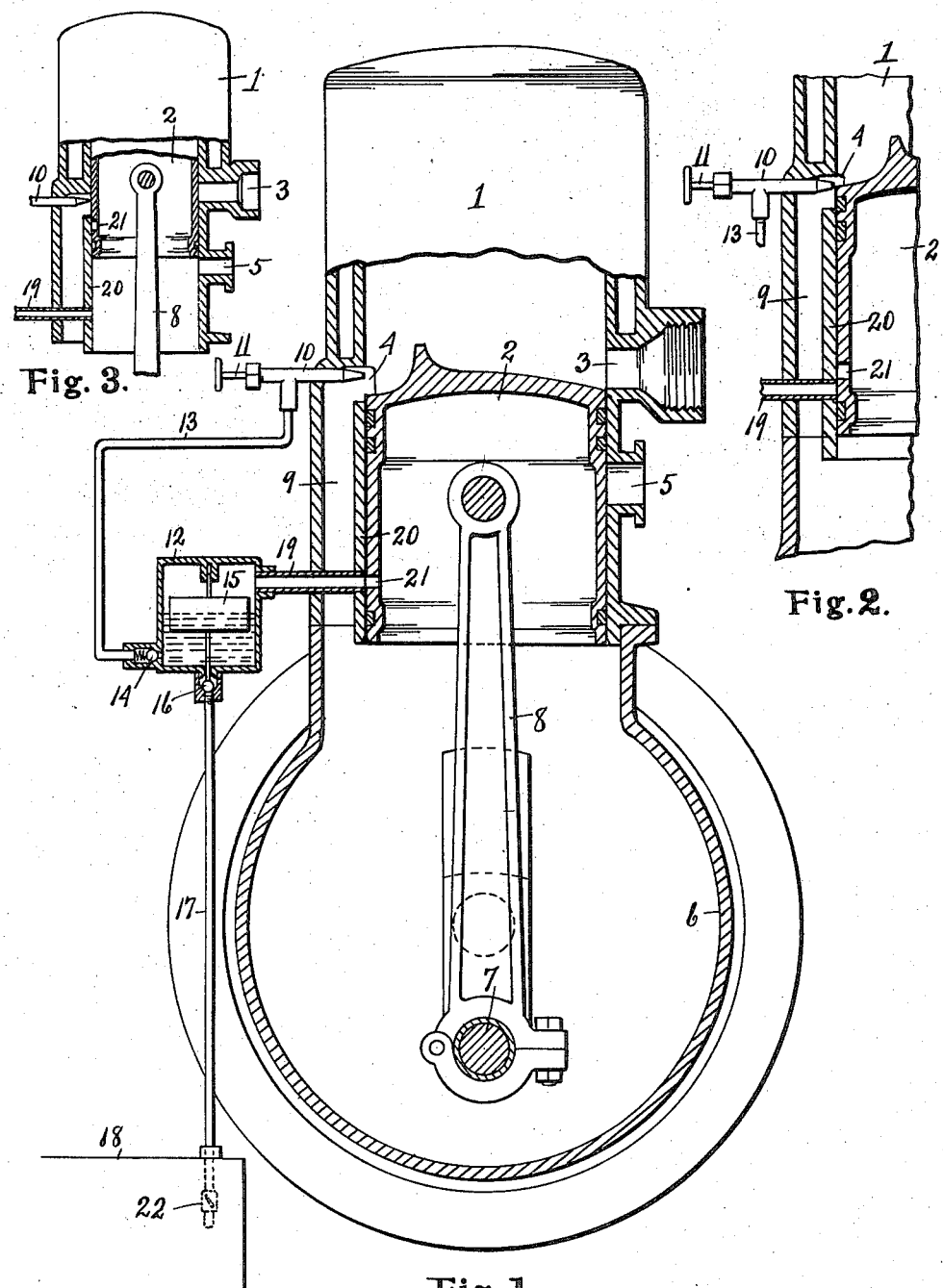

B. W. SCOTT & C. J. SCHIEMER.
CHARGE FORMING DEVICE FOR EXPLOSIVE ENGINES.
APPLICATION FILED JAN. 23, 1911.

1,149,296.

Patented Aug. 10, 1915.

Witnesses
O. B. Baenziger.
J. G. Howlett.

Inventors
Burton W. Scott.
Charles J. Schiemer.
By E. S. Wheeler, Attorney.

UNITED STATES PATENT OFFICE.

BURTON W. SCOTT AND CHARLES J. SCHIEMER, OF DETROIT, MICHIGAN, ASSIGNORS TO ARTHUR COLTON CO., OF DETROIT, MICHIGAN, A CORPORATION OF MICHIGAN.

CHARGE-FORMING DEVICE FOR EXPLOSIVE-ENGINES.

1,149,296.

Specification of Letters Patent. Patented Aug. 10, 1915.

Application filed January 23, 1911. Serial No. 604,074.

*To all whom it may concern:*

Be it known that we, BURTON W. SCOTT and CHARLES J. SCHIEMER, citizens of the United States, residing at Detroit, in the county of Wayne, State of Michigan, have invented certain new and useful Improvements in Charge-Forming Devices for Explosive-Engines; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to charge-forming devices for internal combustion engines, especially designed for use in connection with engines of the two-cycle type, and consists in the construction and arrangement of parts hereinafter more fully set forth and pointed out particularly in the claims.

The object of the invention is to provide simple and efficient means for forcibly injecting a charge of hydrocarbon fuel into the cylinder through the intake port at the time of the passage of the air through said port on its way to the cylinder, provision being made for utilizing the crank case pressure for forcibly feeding the fuel into the cylinder and for relieving said pressure in the fuel chamber immediately after the travel of the piston has fully opened the intake port so that the period during which the operation of injecting the fuel takes place, shall be but momentary to prevent an excessive charge entering the cylinder. The above object is attained by the mechanism illustrated in the accompanying drawings, in which:—

Figure 1 is a general view mainly in section illustrating the application of our invention to a two-cycle engine. Fig. 2 is a fragmentary view in section showing the position of parts upon the initial opening of the intake port or at the time the power stroke of the piston has been nearly completed. Fig. 3 is a fragmentary view in section showing the position of parts when the piston has completed the compression stroke.

Referring to the characters of reference, 1 designates the cylinder in which the piston 2 is adapted to reciprocate. The engine shown is of the three-port type having the exhaust port 3, the charge intake port 4, and the air intake port 5, all of which are controlled by the piston. Connected with the lower end of the cylinder is the usual crank case 6 through which the crank shaft 7 passes, said crank shaft being connected to the piston by the usual connecting rod 8. Leading from the chamber of the crank case is a by-pass 9 which communicates with the charge intake port 4 of the cylinder. Mounted in the wall of the cylinder and projecting into the port 4 is a fuel-feeding nozzle 10 adapted to feed the gasolene, or other hydrocarbon fuel into said port with the inflowing charge of air from the crank case, through the by-pass 9, to form an explosive mixture, said fuel being regulated by the usual needle valve 11. The fuel nozzle 10 communicates with the lower end of an auxiliary fuel reservoir 12 by means of a feed pipe 13 having at its point of connection with said reservoir a check valve 14 to prevent a backward flow of fuel. Within the auxiliary reservoir is a float 15 having a valve 16 connected to its stem adapted to control the level of the gasolene in the reservoir 12 which is supplied through the pipe 17 leading from the main fuel tank 18. The valve 16 serves to shut off a further entrance of fuel into said reservoir 12 by the lifting of the float, when said fuel has attained a predetermined level therein. In the lower end of pipe 17 is a check valve 22 to prevent a backward flow of fuel through said pipe.

Communicating with the upper portion of the auxiliary reservoir above the fuel level therein is a pipe 19, the inner end of which passes through the wall 20 of the cylinder near the lower end thereof. Formed in the wall of the piston 2 is a port 21 adapted to register with the inner end of the pipe or passage 19 when the piston is at the limit of its power stroke, as shown in Fig. 1, at which time said pipe or passage is placed in communication with the crank case through the hollow piston. When the piston moves upwardly on the compression stroke and during the greater portion of its downward travel on the power stroke, the inner end of the pipe or passage 19 remains in communication with the crank case, as illustrated in Fig. 3.

By means of the arrangement of parts shown and above described, the travel of the piston on the power stroke, or under the impetus of the exploded charge, will compress the air in the crank case, as soon as the travel of the piston has closed the port 5, and the air thus compressed will enter the auxiliary reservoir or fuel receptacle 12 thorugh the pipe or passage 19 and at the same time air under pressure will occupy the by-pass 9, a condition which obtains as long as the port 4 remains closed. The piston upon nearing the limit of its power stroke will close with its lower end the inner end of the passage 19, thereby confining within the reservoir 12 what air under pressure may have been stored therein by the compression of the air in the crank case. A further downward travel of the piston will partially open the port 4 as shown in Fig. 2, permitting the compressed air in the by-pass 9 and in the compression chamber to enter the cylinder, thereby relieving the pressure at the discharge end of the feed nozzle, whereupon the excess of pressure in the fuel reservoir 12 will force the fuel therefrom through the pipe 13 and nozzle 10 into the cylinder through the port 4 with the inflowing air, creating an explosive mixture which occupies the cylinder in displacement of the burned gases which escape through the then open exhaust port 3. At the instant the piston reaches the limit of its downward or power stroke, the port 21 therein will be caused to register with the inner end of the pipe or passage 19, as shown in Fig. 1, thereby instantly relieving the pressure in the auxiliary reservoir and equalizing the pressure therein with that in the by-pass 9, causing the feeding of fuel through the nozzle to cease. As the piston moves upwardly to compress the charge in the cylinder, the inner end of the passage 19 is uncovered, whereby the partial vacuum created in the crank case prior to the opening of the air intake port 5 will cause a suction action which will lift the fuel into the receptacle or auxiliary reservoir through the pipe 17 from the main fuel tank, the level of the fuel in the reservoir 12 as before stated being controlled by the float 15. When the piston shall have reached the limit of its compression stroke, port 5 will be opened as shown in Fig. 3, when the crank case will again fill with air in advance of the return stroke of the piston which will compress it therein, as before described.

It will now be apparent that the feeding of fuel charges in the cylinder is made positive at the termination of each power stroke of the piston through the pressure created in the crank case, and that upon the instant of the completion of said stroke, the feeding of the fuel ceases because of the relief of pressure in the auxiliary reservoir by way of the vent port in the piston which at that time registers with the inner end of the passage 19, preventing an overfeeding of fuel and limiting the period of introduction of fuel into the cylinder to the time only during which the air from the crank case is entering the cylinder by way of the by-pass 9, insuring a positive feeding of fuel to the cylinder at the limit of each power stroke of the piston and at a time when the passage of air past the feeding nozzle through the intake port insures a proper mixing of the fuel therewith, whereby all of the fuel which is fed to form each charge is taken up by the air, obviating a flooding of the engine.

Having thus fully set forth our invention, what we claim as new and desire to secure by Letters Patent, is:—

1. In an internal-combustion engine, the combination of a cylinder, a piston therein, a compression chamber communicating with the cylinder through a port adapted to be opened and closed by the piston, a fuel receptacle, a nozzle connecting said receptacle with said cylinder through said port, means for effecting communication between said receptacle and said compression chamber, and means for closing said communication in advance of the opening of said port and for reëstablishing communication between the receptacle and chamber when said port is fully opened.

2. In an internal-combustion engine, the combination of an engine cylinder, a piston therein, a compression chamber, a port connecting said chamber with said cylinder adapted to be opened and closed by said piston, a fuel receptacle, a nozzle connecting said receptacle with the cylinder through said port, means for admitting air under pressure from said chamber into said receptacle, means for maintaining said pressure therein in advance of the opening of said port and for reëstablishing communication between said receptacle and said compression chamber when said port is opened.

3. In an internal-combustion engine, the combination of a cylinder, a piston therein, an air compression chamber, a port connecting said chamber with said cylinder adapted to be opened and closed by said piston, a fuel receptacle, a nozzle connecting said receptacle with said cylinder through said port, a conduit connecting the compression chamber with said receptacle, the piston closing said conduit during a portion of its travel, the wall of the piston having a vent port positioned to register with said conduit when said piston reaches the limit of its power stroke.

4. In an internal-combustion engine, the combination of a cylinder having an inlet port, a piston to open and close said port and having a hole in its wall, a crank-case connecting to the cylinder by said port, a fuel receptacle mounted adjacent the cylinder below the level of said port, a pipe connecting to the fuel receptacle and ending at said port, and a second pipe extending from said fuel receptacle to said crank case and so positioned as to be closed by said piston before the piston reaches the bottom of its stroke and to be opened as the piston reaches the bottom of its stroke.

5. In an internal-combustion engine, the combination of a cylinder and crank-case connected by a port, a piston slidable in the cylinder to open and close said port and having a hole in its wall near the lower end thereof, a fuel receptacle adjacent the cylinder, fuel and air conduits extending therefrom to said cylinder, said air conduit being positioned to register with the hole in said piston as the piston opens said port.

In testimony whereof, we sign this specification in the presence of two witnesses.

BURTON W. SCOTT.
CHARLES J. SCHIEMER.

Witnesses:
I. G. HOWLETT,
O. B. BAENZIGER.